Patented June 27, 1939

2,163,807

UNITED STATES PATENT OFFICE 2,163,807

BASIC REACTION PRODUCTS

Henry Alfred Piggott and Francis Sydney Statham, Blackley, Manchester, England, assignors to Imperial Chemical Industries Limited, a corporation of Great Britain No Drawing. Application May 5, 1937, Serial No. 140,982. In Great Britain May 7, 1936

11 Claims. (Cl. 260—404)

This invention relates to the manufacture of new basic reaction products and salts therefrom.

According to the invention we make the said new products by causing a carboxylic acid derived from a naturally occurring oil, fat or wax, or a mixture of such acids, or the primary amide or amides thereof, to react with ethylene imine and thereafter, if it is desired to form salts, treating the reaction products with acids.

The reaction between the carboxylic acids or amides and ethylene imine may conveniently be brought about by heating the reagents together in a closed vessel, preferably in the presence of a small amount of basic catalyst such as sodium hydroxide or a surface-active substance such as silica gel or kieselguhr.

The temperature and duration of the heating may be varied considerably according to the particular compounds to be treated. In many cases a period of 5 hours heating at 130° C. is convenient, but heating periods as long as 35 hours and temperatures as high as 180° C. have been used without causing discolouration or otherwise adversely affecting the properties of the product.

The presence of a catalyst is not essential in every case. For example, stearic acid has been successfully condensed with five molecules of ethylene imine in the absence of a catalyst.

The proportion of ethylene imine used may likewise be varied over a wide range. Quantities varying between 3 and 40 molecular proportions of ethylene imine for each molecular proportion of acid or amide are preferred, but proportions falling outside this range may likewise be employed.

As acids which may conveniently be used in carrying this invention into practice there may be mentioned caproic, caprylic, capric, lauric, myristic, palmitic, stearic, hydroxystearic, oleic, linoleic, linolenic, ricinoleic, elaidic, undecylenic and erucic acids, likewise mixtures of these acids such as are derivable from natural oils such as coconut oil, palm oil, palm-kernel oil, rape-seed oil, linseed oil, cottonseed oil, or the acids obtainable by fat hydrogenation processes, or the acids of waxes of vegetable, animal or mineral origin, such as beeswax, carnauba wax, montan wax, which contain esters of carboxylic acids with up to about 30 carbon atoms. The primary amides of such acids or mixtures of acids may likewise be employed.

Reaction products made according to the invention are, in general, pale coloured oils or low-melting solids which are soluble in organic solvents such as, for example, benzene, chloroform or ethanol. The products obtained by combining a small proportion of ethylene imine with an acid or amide of high molecular weight are, in general, only very slightly soluble in water, but as the molecular weight of the acid or amide is diminished or the proportion of ethylene imine combined with it is increased the solubility of the product in water increases.

The said reaction products are basic, that is, they are capable of forming salts with acids. Salts may be formed, for example, by treating the reaction products with aqueous acids such as, for example, aqueous hydrochloric or acetic acids. Salts may also be prepared by dissolving the reaction products in a suitable organic solvent and treating the solution so obtained with acids; this in many cases affords a convenient method of purification of the crude reaction mixture. Thus, for example, hydrochlorides may conveniently be prepared by dissolving the reaction products in solvents such as benzene, chloroform, or ethanol and passing into the solution gaseous hydrogen chloride. According to the reaction product and solvent employed, hydrochlorides so formed either precipitate from solution, in which case they are readily isolated by filtration, or remain dissolved and are obtained in the dry solid state by evaporating off the solvent.

The salts of our new basic reaction products are, in general, soluble in water and these aqueous solutions are useful in textile treatment processes.

The invention is illustrated but not limited by the following examples, in which the parts are by weight.

*Example 1*

5.7 parts of stearic acid, 4.3 parts of ethylene imine (5 molecular proportions) and 0.2 part of 8.0% aqueous sodium hydroxide are heated together in a closed vessel at 130° C. for 5 hours. The reaction product obtained is a pale coloured, low-melting, waxy solid which is insoluble in water but soluble in benzene or ethanol.

For the purpose of preparing a hydrochloride the reaction product (1 part) is dissolved in benzene (6 parts) and the solution is saturated with gaseous hydrogen chloride. After standing for some time the benzene is evaporated off, leaving a pale coloured solid hydrochloride which is soluble in water to give foaming solutions. By using ethanol instead of benzene as a solvent in the preparation of a hydrochloride as described above, a white solid salt precipitates, which is filtered off and dried. The dry salt is soluble in water to give clear foaming solutions.

A similar reaction product is obtained by heating 5.7 parts of stearic acid with 4.3 parts of ethylene imine (5 molecular proportions) for 6 hours at 130° C. in the absence of a catalyst. It is a pale coloured low-melting waxy solid which is insoluble in water and soluble in benzene or ethanol.

Example 2

5.7 parts of stearic acid amide, 4.3 parts of ethylene imine (5 molecular proportions) and 0.2 part of 8.0% aqueous sodium hydroxide are heated for 10 hours at 130° C. in a closed vessel. The reaction product is a pale coloured, low-melting solid which is insoluble in water. By dissolving the reaction product in six times its weight of ethanol and saturating the solution with hydrogen chloride, a white, solid hydrochloride precipitates, which is filtered off and dried. The dried salt is soluble in water to give foaming solutions.

Example 3

14.2 parts of stearic acid, 21.5 parts of ethylene imine (10 molecular proportions) and 0.5 part of 8.0% aqueous sodium hydroxide are heated in a closed vessel for 35 hours at 140° C. The reaction product so obtained is a low-melting, pale coloured waxy solid which is soluble in water. Dry gaseous hydrogen chloride is passed through a solution of the reaction product (1 part) in a mixture of ethanol (7 parts) and acetone (3 parts). The hydrochloride is obtained as a granular powder and is filtered off and dried; it is a cream coloured, slightly hygroscopic solid which is soluble in water to give clear foaming solutions.

Example 4

5.6 parts of oleic acid, 6.0 parts of ethylene imine (7 molecular proportions) and 0.2 part of 8.0% aqueous sodium hydroxide are heated in a closed vessel for 5 hours at 130° C. The so-obtained reaction product is a pale yellow clear viscous mass which is soluble in water to give forming solutions. By dissolving the reaction product in nine times its weight of ethanol and saturating the solution with dry gaseous hydrogen chloride a white, slightly sticky precipitate of the hydrochloride is obtained. By decanting the mother liquor and grinding the precipitate with acetone a white granular solid is obtained which is filtered off and dried. It is hygroscopic and dissolves readily in water to give clear foaming solutions.

Example 5

2.25 parts of mixed coconut oil fatty acids, 12.9 parts of ethylene imine (30 molecular proportions) and 0.3 part of 8.0% aqueous sodium hydroxide are heated together in a closed vessel at 180° C. for 20 hours. After cooling 3.9 parts (9 molecular proportions) of unreacted ethylene imine are removed by distillation (if necessary under reduced pressure). The basic reaction product so obtained is a yellow, low-melting, gelatinous mass which dissolves readily in water to give foaming solutions. By dissolving the reaction product (1 part) in a mixture of ethanol (9 parts) and acetone (9 parts) and passing dry gaseous hydrogen chloride through the solution, a gummy precipitate of the hydrochloride is obtained. This is filtered off and dried under reduced pressure. It is then a fawn coloured brittle hygroscopic mass, very soluble in water to give clear foaming solutions.

Example 6

9.5 parts of stearic acid, 4.3 parts of ethylene imine (3 molecular proportions) and 0.2 part of 8.0% aqueous sodium hydroxide are heated together in a closed vessel for 5 hours at 130° C. The reaction product so obtained is a pale-coloured, low-melting waxy solid almost insoluble in water and soluble in ethanol or acetone. The reaction product (1 part) is dissolved in a mixture of ethanol (6 parts) and acetone (3 parts) at 40° C. and dry gaseous hydrogen chloride is passed through the solution, when the hydrochloride is precipitated as a cream-coloured powder. It is readily soluble in water to give clear foaming solutions.

Example 7

10.0 parts of lauric acid, 6.5 parts of ethylene imine (3 molecular proportions) and 0.3 part of 8.0% aqueous sodium hydroxide are heated together in a closed vessel for 6 hours at 130° C. The reaction product so obtained is a cream-coloured, low-melting waxy solid, slightly soluble in cold water and moderately soluble on warming; it is readily soluble in ethanol or acetone. By dissolving the reaction product (1 part) in 6 parts of acetone and saturating the solution with dry gaseous hydrogen chloride a cream coloured precipitate of the hydrochloride is obtained. It is very hygroscopic and dissolves readily in water to give clear foaming solutions.

We claim:

1. A process for the manufacture of new basic reaction products which comprises heating a compound selected from the group consisting of aliphatic carboxylic acids containing at least six carbon atoms and the primary amides of said acids with at least 3 molecular proportions of ethylene imine.

2. A process according to claim 1 wherein the reactants are heated together for at least 5 hours at temperatures of about 130° C. or more in the presence of catalytic proportions of sodium hydroxide.

3. A process according to claim 1 wherein the basic reaction products are dissolved in an organic solvent and gaseous hydrogen chloride is passed through said solution to obtain the hydrochlorides of the basic reaction products.

4. Chemical products of the group consisting of basic reaction products which are obtained by heating a compound selected from the group consisting of aliphatic carboxylic acids containing at least six carbon atoms and the primary amides of said acids with at least 3 molecular proportions of ethylene imine and the acetates and hydrochlorides of said basic reaction products.

5. Chemical products of the group consisting of basic reaction products which are obtained by heating an aliphatic carboxylic acid containing at least six carbon atoms with at least 3 molecular proportions of ethylene imine and the acetates and hydrochlorides of said basic reaction products.

6. Basic reaction products obtained by causing an aliphatic carboxylic acid containing at least six carbon atoms to react at elevated temperature with at least 3 molecular proportions of ethylene imine in the presence of catalytic proportions of sodium hydroxide.

7. Hydrochlorides of the basic reaction products defined in claim 6.

8. Chemical products of the group consisting of basic reaction products which are obtained by heating a primary amide of an aliphatic carboxylic acid containing at least six carbon atoms with at least 3 molecular proportions of ethylene imine and the acetates and hydrochlorides of said basic reaction products.

9. Basic reaction products obtained by causing a primary amide of an aliphatic carboxylic acid containing at least six carbon atoms to react at elevated temperature in the presence of a catalytic proportion of sodium hydroxide with at least 3 molecular proportions of ethylene imine.

10. A basic reaction product obtained by heating stearic acid with at least 3 molecular proportions of ethylene imine in the presence of catalytic proportions of sodium hydroxide.

11. A basic reaction product obtained by heating stearic acid amide with at least 3 molecular proportions of ethylene imine in the presence of catalytic proportions of sodium hydroxide.

HENRY ALFRED PIGGOTT.
FRANCIS SYDNEY STATHAM.